(12) United States Patent
Iwamoto (10) Patent No.: US 8,316,220 B2
(45) Date of Patent: Nov. 20, 2012

(54) OPERATING PROCESSORS OVER A NETWORK

(75) Inventor: Tatsuya Iwamoto, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 798 days.

(21) Appl. No.: 11/238,086

(22) Filed: Sep. 27, 2005

(65) Prior Publication Data

US 2007/0074206 A1    Mar. 29, 2007

(51) Int. Cl.
*G06F 15/16* (2006.01)
(52) U.S. Cl. .......................................... 712/244
(58) Field of Classification Search .................. 709/217; 712/1, 10, 23, 28, 32, 244
See application file for complete search history.

(56) References Cited

U.S. PATENT DOCUMENTS

| | | |
|---|---|---|
| 3,496,551 A | 2/1970 | Driscoll et al. |
| 3,596,257 A | 7/1971 | Patel |
| 5,047,923 A | 9/1991 | Elstner et al. |
| 5,136,712 A | 8/1992 | Perazzoli, Jr. et al. |
| 5,185,694 A | 2/1993 | Edenfield et al. |
| 5,452,452 A | 9/1995 | Gaetner et al. ................ 395/650 |
| 5,504,901 A | 4/1996 | Peterson |
| 5,528,513 A | 6/1996 | Vaitzblit et al. |
| 5,592,671 A | 1/1997 | Hirayama |
| 5,745,778 A | 4/1998 | Alfieri ...................... 395/800.01 |
| 5,794,017 A | 8/1998 | Evans et al. .................... 395/507 |
| 5,832,262 A | 11/1998 | Johnson et al. ............... 395/672 |
| 6,003,112 A | 12/1999 | Tetrick |
| 6,144,986 A | 11/2000 | Silver |
| 6,279,040 B1 | 8/2001 | Ma et al. ...................... 709/231 |
| 6,289,369 B1 | 9/2001 | Sundaresan ................... 709/103 |
| 6,295,598 B1 | 9/2001 | Bertoni et al. |
| 6,341,324 B1 * | 1/2002 | Caulk et al. .................... 710/260 |
| 6,370,681 B1 | 4/2002 | Dellarocas et al. |
| 6,378,072 B1 * | 4/2002 | Collins et al. ................. 713/187 |
| 6,463,457 B1 * | 10/2002 | Armentrout et al. .......... 709/201 |
| 6,526,491 B2 | 2/2003 | Suzuoki et al. |
| 6,665,699 B1 | 12/2003 | Hunter et al. ................. 709/102 |
| 6,665,783 B2 | 12/2003 | Zahir |

(Continued)

FOREIGN PATENT DOCUMENTS

EP    0 806 730    11/1997

(Continued)

OTHER PUBLICATIONS

"Cell Broadband Engine Architecture" IBM, Aug. 8, 2005, pp. 1-50, 237-261.*

(Continued)

*Primary Examiner* — David Y Eng
(74) *Attorney, Agent, or Firm* — Joshua D. Isenberg; JDI Patent (57) ABSTRACT

Processors, data structures and methods for operating two or more processors over a network are disclosed. A processor can load, store and save information relating to the operation of one or more of its secondary processors in a unit of migration that includes either contents of exclusively associated memories of two or more secondary processors related to the execution state of a suspended process or contents of exclusively associated memories of one or more secondary processors related to the execution state of a suspended process and shared initialized data for the process. Such a unit of migration may be embodied in a processor readable medium.

61 Claims, 7 Drawing Sheets

U.S. PATENT DOCUMENTS

| | | | |
|---|---|---|---|
| 6,728,959 B1 | 4/2004 | Merkey | 718/102 |
| 6,785,756 B2 | 8/2004 | Candea et al. | |
| 6,792,461 B1 | 9/2004 | Hericourt | |
| 7,024,671 B2 | 4/2006 | Yamashita | |
| 7,039,736 B2 | 5/2006 | Mantey et al. | |
| 7,058,750 B1 | 6/2006 | Rankin et al. | |
| 7,127,477 B2 * | 10/2006 | Duncombe et al. | 707/203 |
| 7,236,738 B2 * | 6/2007 | Settle | 455/3.01 |
| 7,236,998 B2 * | 6/2007 | Nutter et al. | 708/446 |
| 7,298,377 B2 * | 11/2007 | Fossum et al. | 345/584 |
| 7,304,646 B2 * | 12/2007 | Iwata | 345/537 |
| 7,321,958 B2 * | 1/2008 | Hofstee et al. | 711/153 |
| 7,478,390 B2 | 1/2009 | Brokenshire et al. | |
| 7,506,123 B1 | 3/2009 | Labour et al. | |
| 7,516,456 B2 | 4/2009 | Aguilar, Jr. | |
| 7,522,168 B2 | 4/2009 | Stenson et al. | |
| 7,565,651 B1 | 7/2009 | Carey | |
| 7,734,827 B2 | 6/2010 | Iwamoto | |
| 2002/0138637 A1 | 9/2002 | Suzuoki et al. | 709/230 |
| 2003/0154284 A1 | 8/2003 | Bernardin et al. | |
| 2003/0195920 A1 | 10/2003 | Brenner et al. | |
| 2004/0054883 A1 | 3/2004 | Goodman et al. | 713/1 |
| 2005/0081202 A1 | 4/2005 | Brokenshire et al. | |
| 2005/0081203 A1 | 4/2005 | Aguilar et al. | |
| 2005/0091473 A1 | 4/2005 | Aguilar et al. | 712/28 |
| 2005/0188372 A1 | 8/2005 | Inoue et al. | |
| 2005/0188373 A1 | 8/2005 | Inoue et al. | 718/100 |
| 2006/0190942 A1 | 8/2006 | Inoue et al. | |
| 2007/0074207 A1 | 3/2007 | Bates et al. | |
| 2007/0074212 A1 | 3/2007 | Bates et al. | |
| 2007/0198628 A1 | 8/2007 | Bates et al. | |
| 2009/0147013 A1 | 6/2009 | Stenson et al. | |

FOREIGN PATENT DOCUMENTS

| | | |
|---|---|---|
| GB | 2394336 | 4/2004 |
| JP | 2001005679 | 1/2001 |
| JP | 2002007364 | 1/2002 |
| JP | 2004246702 | 9/2004 |
| JP | 2004320174 | 11/2004 |
| JP | 2005235229 | 9/2005 |
| WO | WO 97/06484 | 2/1997 |
| WO | 0203208 | 1/2002 |
| WO | WO 02/091180 | 11/2002 |
| WO | 2004015553 | 2/2004 |
| WO | WO 2004/084069 | 9/2004 |

OTHER PUBLICATIONS

Sony Computer Entertainment Incorporated , "Cell Broadband Engine Architecture", Version 1.0, Aug. 8, 2005.

Pratit Santiprabhob et al. "Fuzzy Rule-Based Process Scheduling Method for Critical Distributed Computing Environment"—Proceedings 2003 IEEE, Mar. 8, 2003, vol. 5, pp. 52267-52276.

J. A. Kahle et al. "Introduction to the Cell Multiprocessor" IBM Journal of Research and Development, vol. 49, No. 4-5, Jul. 2005, pp. 589-604.

George M. Candea et al. "Vassal: Loadable Scheduler Support for Multi-Policy Scheduling" Proceedings of the Usenix Window NT Symposium, Aug. 1998, pp. 157-166.

Alexandre E. Eichenberger et al., "Optimizing Compiler for a Cell Processor", Proceedings of 14$^{th}$ International Conference on Parallel Architectures and Compilation Techniques, 2005 (PACT'05), pp. 161-172.

B. Flachs et al., "A Streaming Processing Unit for a Cell Processor", 2005 IEEE International Solid-State Circuits Conference—Digest of Technical Papers, pp. 134-135.

Scott Whitman, "Dynamic Load Balancing for Parallel Polygon Rendering", IEEE Computer Graphics and Applications, vol. 14, No. 4, Jul. 1994, pp. 41-48.

Jaspal Subhlok et al., "Communication and Memory Requirements as the Basis for Mapping Task and Data Parallel Programs", Supercomputing' 94, Proceedings Washington, DC, 1994 IEEE, pp. 330-339.

Alan Heirich, "Optimal Automatic Multi-Pass Shader Partitioning by Dynamic Programming", Graphics Hardware (2005), pp. 91-98.

International application No. PCT/US2006/037345, "The International Search Report" and "The Written Opinion of the International Searching Authority".

International application No. PCT/US2006/037334, "The International Search Report and the Written Opinion of the International Searching Authority".

International application No. PCT/US2006/037336, "The International Search Report and the Written Opinion of the International Searching Authority".

International application No. PCT/US2006/037338, "The International Search Report and the Written Opinion of the International Searching Authority".

U.S. Appl. No. 11/238,077, entitled "Cell Processor Methods and Apparatus", to John P. Bates et al, filed Sep. 27, 2005.

U.S. Appl. No. 11/238,087, entitled "SPU Task Manager for Cell Processor", to John P. Bates et al, filed Sep. 27, 2005.

U.S. Appl. No. 11/238,085, entitled "Method and System for Performing Memory Copy Function on a Cell Processor", to Antoine Labour et al, filed Sep. 27, 2005.

U.S. Appl. No. 11/257,761, entitled "Secure Operation of Cell Processors", to Tatsuya Iwamoto, filed Oct. 24, 2005.

U.S. Appl. No. 11/238,095, entitled "Cell Processor Task and Data Management", to Richard B. Stenson et al, filed Sep. 27, 2005.

D S Milojicic et al., "Process Migration" ACM Computing Surveys, ACM, New York, NY, US, vol. 32, No. 3, Sep. 2000, pp. 241-299, XP002254767 ISSN: 0360-0300.

K Chanchio et al., "Data Collection and Restoration for Heterogeneous Process Migration" Software Practice & Experience, Wiley & Sons, Bognor Regis, GB, vol. 32, No. 9, Jul. 25, 2002, pp. 845-871, XP001115308 ISSN: 0038-0644.

European Search Report for European application No. 06254919 dated Dec. 21, 2007.

William et al., "The Potential of the Cell Processor for Scientific Computing", Conference on Computing Frontiers, ACM, 2006, pp. 9-20.

Gschwind, "Chip Multiprocessing and the Cell Broadband Engine", ACM, 2006, pp. 1-8.

Office Action dated Jan. 10, 2008 for U.S. Appl. No. 11/238,095.

Final Office Action dated Jul. 29, 2008 for U.S. Appl. No. 11/238,095.

Office Action dated Nov. 24, 2008 for U.S. Appl. No. 11/257,761, 9 pages.

Final OFfice Action dated May 7, 2009 for U.S. Appl. No. 11/257,761.

Non-Final Office Action for U.S. Appl. No. 11/257,761 dated Aug. 27, 2009.

Notice of Allowance and Fee(s) Due dated Jan. 26, 2010 issued for U.S. Appl. No. 11/257,761.

U.S. Appl. No. 12/787,344, filed May 25, 2010.

Office Action dated May 27, 2010 for Chinese patent application No. 200610142304.7 and its English translation.

Office Action dated May 6, 2010 for Chinese patent application No. 200610142305.1 and its English translation.

Office Action dated Aug. 16, 2010 for Japanese patent application No. 2006-262023 and its English translation.

Office Action dated Aug. 16, 2010 for Japanese patent application No. 2006-262024 and its English translation.

Office Action dated Aug. 16, 2010 for U.S. Appl. No. 11/238,087.

Office Action dated Mar. 12, 2010 issued for U.S. Appl. No. 11/238,077.

Final Office Action dated Aug. 5, 2010 issued for U.S. Appl. No. 11/238,077.

Office Action dated Oct. 16, 2009 issued for U.S. Appl. No. 12/371,424.

Notice of Allowance and Fee Due(s) dated Mar. 8, 2010 issued for U.S. Appl. No. 12/371,424.

Office Action dated Aug. 30, 2007 issued for U.S. Appl. No. 11/238,085.

Notice of Allowance and Fee(s) Due dated Nov. 25, 2008 issued for U.S. Appl. No. 11/238,095.

Office Action dated Feb. 20, 2008 issued for U.S. Appl. No. 11/238,085.

Final Office Action dated Aug. 5, 2008 issued for U.S. Appl. No. 11/238,085.
Notice of Allowance and Fee Due(s) dated Nov. 3, 2008 issued for U.S. Appl. No. 11/238,085.
Office Action dated Apr. 14, 2010 issued for U.S. Appl. No. 11/238,087.
U.S. Appl. No. 60/650,153, filed Feb. 4, 2005.
Office Action dated Jan. 27, 2011 for Japanese patent application No. 2006-262023 and its English translation.
Office Action dated Jan. 27, 2011 for Japanese patent application No. 2006-262024 and its English translation.
Office Action dated Jan. 28, 2011 issued for U.S. Appl. No. 11/238,087.
Office Action dated Dec. 3, 2010 for Chinese patent application No. 200610142305.1 and its English translation.
Milojicic D S et al: "Process migration", ACM Computing Surveys, ACM, New York, NY, US, US, vol. 32, No. 3, Sep. 2000, pp. 241-299, XP002254767, ISSN: 0360-0300.
Saxena N R et al: "Control-flow checking using watchdog assists and extended-precision checksums", International Symposium on Fault Tolerant Computing. (FTCS). Chicago, June 20-23, 1989; [International Symposium on Fault Tolerant Computing Systems. (FTCS)], Washington, IEEE Comp. Soc. Press, US, vol. SYMP. 19, Jun. 21, 1989, pp. 428-435, XP010016731, DOI: D0I:10.1109/FTCS.1989.105615 ISBN: 978-0-8186-1959-5.
Kahle J A et al: "Introduction to the Cell multiprocessor", IBM Journal of Research and Development, International Business Machines Corporation, New York, NY, US, vol. 49, No. 4-5, Jul. 2005, pp. 589-604, XP002415988, ISSN: 0018-8646.
European Patent Application w/European Search Report, EP2284702 A1, Feb. 16, 2011, "Operating Cell Processors Over a Network", Tatsuya Iwamoto, Foster City CA 94404-2175 (US), 22 pages https://data.epo.org/publication-server/getpdf.jsp?pn=2284702&ki=A1&cc=EP.

* cited by examiner

OPERATING PROCESSORS OVER A NETWORK

CROSS-REFERENCE TO RELATED APPLICATIONS

This application is related to commonly-assigned U.S. patent application Ser. No. 11/238,077 entitled "CELL PROCESSOR METHODS AND APPARATUS" to John P. Bates, Payton R. White and Attila Vass, which is filed the same day as the present application, the entire disclosures of which are incorporated herein by reference.

This application is also related to commonly-assigned U.S. patent application Ser. No. 11/238,095 entitled "CELL PROCESSOR TASK AND DATA MANAGEMENT" to Richard B. Stenson and John P. Bates, which is filed the same day as the present application, the entire disclosures of which are incorporated herein by reference.

This application is related to commonly-assigned U.S. patent application Ser. No. 11/238,087 entitled "SPU TASK MANAGER FOR CELL PROCESSOR" to John P. Bates, Payton R. White, Richard B. Stenson, Howard Berkey, Attila Vass and Mark Cerny, which is filed the same day as the present application, the entire disclosures of which are incorporated herein by reference.

This application is also related to commonly-assigned U.S. patent application Ser. No. 11/238,085 entitled "METHOD AND SYSTEM FOR PERFORMING MEMORY COPY FUNCTION ON A CELL PROCESSOR" to Antoine Labour John P. Bates and Richard B. Stenson, which is filed the same day as the present application, the entire disclosures of which are incorporated herein by reference.

FIELD OF THE INVENTION

Embodiments of the present invention are directed cell processors and more particularly to operating multiple cell processors over a network.

BACKGROUND OF THE INVENTION

Cell processors are a type of microprocessor that utilizes parallel processing. The basic configuration of a cell processor includes a "Power Processor Element" ("PPE") (sometimes called "Processing Element", or "PE"), and multiple "Synergistic Processing Elements" ("SPE"). The PPEs and SPEs are linked together by an internal high speed bus dubbed "Element Interconnect Bus" ("EIB"). Cell processors are designed to be scalable for use in applications ranging from the hand held devices to main frame computers.

In certain cell processors, the SPEs provide a monolithic execution environment. Each SPE has a well isolated execution set or context that facilitates portability and network transparency of applications running on the cell processor. Such portable SPE applications have been called SPUlets or APUlets. However, there are disadvantages associated with the identical execution environment sizes for the SPUlets. Specifically, SPUlets only come in a single grain size. A normal prior art SPUlet can simply be a single executable file image that is to be loaded into a single SPE. As applications expect more resources for execution, splitting these resources into multiple SPUlets is not efficient, particularly when such SPUlets need to be transferred across a network.

Thus, there is a need in the art, for a data structure having a larger sized unit of migration so that cell processor applications can be packaged and migrated to operate and interoperate across and in a network.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

In embodiments of the present invention, a cell processor can load, store and save information relating to the operation of one or more SPE of the cell processor in units of migration referred to herein as extended SPUlets. Unlike prior art SPUlets, an extended SPUlet according to embodiments of the present invention may include either two or more SPU images or one or more SPU images and additional information related to operation of multiple SPU, e.g., shared initialized data. Generally, the shared data is shared by two or more SPE that execute the extended SPUlet. To isolate the execution context, it is desirable to avoid PPU access to the shared data. However, the PPU may do so for the purpose of management, such as suspend and resume. Communication between the extended SPUlet and managing PPU can be done through a message box area of memory specifically set up for that purpose. The extended SPUlet provides a larger grain size than prior art SPUlets. The extended SPUlet can address issues of setting up multiple SPEs, providing additional memory for shared initialized data, additional code, etc., and memory mapping between the SPEs and system main memory.

A cell processor may generally include four separate types of functional components: a PowerPC Processor Element (PPE), a Synergistic Processor Unit (SPU), a Memory Flow Controller (MFC) and an Internal Interrupt Controller (IIC). The computational units in the CBEA-compliant processor are the PPE and the SPU. Each SPU must have a dedicated local storage, a dedicated MFC with its associated Memory Management Unit MMU), and Replacement Management Table (RMT). The combination of these components is referred to as an SPU Element, (SPE). A cell processor may be a single chip, a multi-chip module (or modules), or multiple single-chip modules on a motherboard or other second-level package, depending on the technology used and the cost/performance characteristics of the intended design point.

Figure 1:
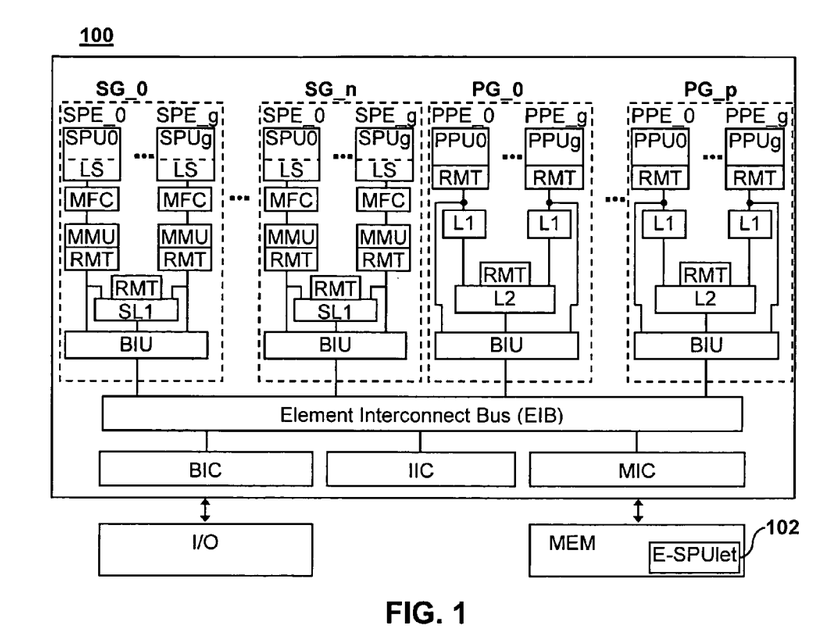
FIG. 1 is a schematic diagram of a cell broadband engine architecture implementing an extended SPUlet according to an embodiment of the present invention.

By way of example, and without limitation, FIG. 1 illustrates a type of cell processor 100 characterized by an architecture known as Cell Broadband engine architecture (CBEA)—compliant processor. A cell processor can include multiple groups of PPEs (PPE groups) and multiple groups of SPEs (SPE groups) as shown in this example. Alternatively, the cell processor may have only a single SPE group and a single PPE group with a single SPE and a single PPE. Hardware resources can be shared between units within a group. However, the SPEs and PPEs must appear to software as independent elements.

In the example depicted in FIG. 1, the cell processor 100 includes a number of groups of SPEs SG-0 . . . SG_n and a number of groups of PPEs PG_0 . . . PG_p. Each SPE group includes a number of SPEs SPE0 . . . SPEg. The cell processor 100 also includes a main memory MEM and an input/output function I/O. One or more extended SPUlets 102 of the 20 types described herein may be stored in the main memory MEM.

Each PPE group includes a number of PPEs PPE_0 . . . PPE_g SPE. In this example a group of SPEs shares a single cache SL1. The cache SL1 is a first-level cache for direct memory access (DMA) transfers between local storage and main storage. Each PPE in a group has its own first level (internal) cache L1. In addition the PPEs in a group share a single second-level (external) cache L2. While caches are shown for the SPE and PPE in FIG. 1, they are optional for cell processors in general and CBEA in particular.

An Element Interconnect Bus EIB connects the various components listed above. The SPEs of each SPE group and the PPEs of each PPE group can access the EIB through bus interface units BIU. The cell processor 100 also includes two controllers typically found in a 30 processor: a Memory Interface Controller MIC that controls the flow of data between the EIB and the main memory MEM, and a Bus Interface Controller BIC, which controls the flow of data between the I/O and the EIB. Although the requirements for the MIC, BIC, BIUs and EIB may vary widely for different implementations, those of skill in the art will be familiar their functions and circuits for implementing them.

Each SPE is made includes an SPU (SPU0 . . . SPUg). Each SPU in an SPE group has its own local storage area LS and a dedicated memory flow controller MFC that includes an associated memory management unit MMU that can hold and process memory-protection and access-permission information.

The PPEs may be 64-bit PowerPC Processor Units (PPUs) with associated caches. A CBEA-compliant system includes a vector multimedia extension unit in the PPE. The PPEs are general-purpose processing units, which can access system management resources (such as the memory-protection tables, for example). Hardware resources defined in the CBEA are mapped explicitly to the real address space as seen by the PPEs. Therefore, any PPE can address any of these resources directly by using an appropriate effective address value. A primary function of the PPEs is the management and allocation of tasks for the SPEs in a system.

The SPUs are less complex computational units than PPEs, in that they do not perform any system management functions. They generally have a single instruction, multiple data (SIMD) capability and typically process data and initiate any required data transfers (subject to access properties set up by a PPE) in order to perform their allocated tasks. The purpose of the SPU is to enable applications that require a higher computational unit density and can effectively use the provided instruction set. A significant number of SPUs in a system, managed by the PPEs, allow for cost-effective processing over a wide range of applications. The SPUs implement a new instruction set architecture.

MFC components are essentially the data transfer engines. The MFC provides the primary method for data transfer, protection, and synchronization between main storage of the cell processor and the local storage of an SPE. An MFC command describes the transfer to be performed. A principal architectural objective of the MFC is to perform these data transfer operations in as fast and as fair a manner as possible, thereby maximizing the overall throughput of a cell processor. Commands for transferring data are referred to as MFC DMA commands. These commands are converted into DMA transfers between the local storage domain and main storage domain.

Each MFC can typically support multiple DMA transfers at the same time and can maintain and process multiple MFC commands. In order to accomplish this, the MFC maintains and processes queues of MFC commands. The MFC can queue multiple transfer requests and issues them concurrently. Each MFC provides one queue for the associated SPU (MFC SPU command queue) and one queue for other processors and devices (MFC proxy command queue). Logically, a set of MFC queues is always associated with each SPU in a cell processor, but some implementations of the architecture can share a single physical MFC between multiple SPUs, such as an SPU group. In such cases, all the MFC facilities must appear to software as independent for each SPU. Each MFC DMA data transfer command request involves both a local storage address (LSA) and an effective address (EA). The local storage address can directly address only the local storage area of its associated SPU. The effective address has a more general application, in that it can reference main storage, including all the SPU local storage areas, if they are aliased into the real address space (that is, if MFC_SR1[D] is set to '1').

An MFC presents two types of interfaces: one to the SPUs and another to all other processors and devices in a processing group. The SPUs use a channel interface to control the MFC. In this case, code running on an SPU can only access the MFC SPU command queue for that SPU. Other processors and devices control the MFC by using memory-mapped registers. It is possible for any processor and device in the system to control an MFC and to issue MFC proxy command requests on behalf of the SPU. The MFC also supports bandwidth reservation and data synchronization features. To facilitate communication between the SPUs and/or between the SPUs and the PPU, the SPEs and PPEs may include signal notification registers that are tied to signaling events. Typically, the PPEs and SPEs are coupled by a star topology in which the PPE acts as a router to transmit messages to the SPEs. Such a topology does not provide for direct communication between SPEs. Instead each SPE and each PPE has a one-way signal notification register referred to as a mailbox. The mailbox can be used for SPE to host OS synchronization.

The IIC component manages the priority of the interrupts presented to the PPEs. The main purpose of the IIC is to allow interrupts from the other components in the processor to be handled without using the main system interrupt controller. The IIC is really a second level controller. It is intended to handle all interrupts internal to a CBEA-compliant processor or within a multiprocessor system of CBEA-compliant processors. The system interrupt controller will typically handle all interrupts external to the cell processor.

In a cell processor system, software often must first check the IIC to determine if the interrupt was sourced from an external system interrupt controller. The IIC is not intended to replace the main system interrupt controller for handling interrupts from all I/O devices.

There are two types of storage domains within the cell processor: local storage domain and main storage domain. The local storage of the SPEs exists in the local storage domain. All other facilities and memory are in the main storage domain. Local storage consists of one or more separate areas of memory storage, each one associated with a specific SPU. Each SPU can only execute instructions (including data load and data store operations) from within its own associated local storage domain. Therefore, any required data transfers to, or from, storage elsewhere in a system must always be performed by issuing an MFC DMA command to transfer data between the local storage domain (of the individual SPU) and the main storage domain, unless local storage aliasing is enabled.

An SPU program references its local storage domain using a local address. However, privileged software can allow the local storage domain of the SPU to be aliased into main storage domain by setting the D bit of the MFC_SR1 to '1'. Each local storage area is assigned a real address within the main storage domain. (A real address is either the address of a byte in the system memory, or a byte on an I/O device.) This allows privileged software to map a local storage area into the effective address space of an application to allow DMA transfers between the local storage of one SPU and the local storage of another SPU.

Other processors or devices with access to the main storage domain can directly access the local storage area, which has been aliased into the main storage domain using the effective address or I/O bus address that has been mapped through a translation method to the real address space represented by the main storage domain.

Data transfers that use the local storage area aliased in the main storage domain should do so as caching inhibited, since these accesses are not coherent with the SPU local storage accesses (that is, SPU load, store, instruction fetch) in its local storage domain. Aliasing the local storage areas into the real address space of the main storage domain allows any other processors or devices, which have access to the main storage area, direct access to local storage. However, since aliased local storage must be treated as non-cacheable, transferring a large amount of data using the PPE load and store instructions can result in poor performance. Data transfers between the local storage domain and the main storage domain should use the MFC DMA commands to avoid stalls.

The addressing of main storage in the CBEA is compatible with the addressing defined in the PowerPC Architecture. The CBEA builds upon the concepts of the PowerPC Architecture and extends them to addressing of main storage by the MFCs.

An application program executing on an SPU or in any other processor or device uses an effective address to access the main memory. The effective address is computed when the PPE performs a load, store, branch, or cache instruction, and when it fetches the next sequential instruction. An SPU program must provide the effective address as a parameter in an MFC command. The effective address is translated to a real address according to the procedures described in the overview of address translation in PowerPC Architecture, Book III. The real address is the location in main storage which is referenced by the translated effective address. Main storage is shared by all PPEs, MFCs, and I/O devices in a system. All information held in this level of storage is visible to all processors and to all devices in the system. This storage area can either be uniform in structure, or can be part of a hierarchical cache structure. Programs reference this level of storage using an effective address.

The main memory of a system typically includes both general-purpose and nonvolatile storage, as well as special-purpose hardware registers or arrays used for functions such as system configuration, data-transfer synchronization, memory-mapped I/O, and I/O subsystems. There are a number of different possible configurations for the main memory. By way of example and without limitation, Table I lists the sizes of address spaces in main memory for a particular cell processor implementation known as Cell Broadband Engine Architecture (CBEA)

TABLE I

| Address Space | Size | Description |
| --- | --- | --- |
| Real Address Space | $2^m$ bytes | where $m \leq 62$ |
| Effective Address Space | $2^{64}$ bytes | An effective address is translated to a virtual address using the segment lookaside buffer (SLB). |
| Virtual Address Space | $2^n$ bytes | where $65 \leq n \leq 80$ A virtual address is translated to a real address using the page table. |
| Real Page | $2^{12}$ bytes | |
| Virtual Page | $2^p$ bytes | where $12 \leq p \leq 28$ Up to eight page sizes can be supported simultaneously. A small 4-KB (p = 12) page is always supported. The number of large pages and their sizes are implementation-dependent. |
| Segment | $2^{28}$ bytes | The number of virtual segments is $2(n - 28)$ where $65 \leq n \leq 80$ |

Note:
The values of "m," "n," and "p" are implementation-dependent.

The cell processor 100 may include an optional facility for managing critical resources within the processor and system. The resources targeted for management under the cell processor are the translation lookaside buffers (TLBs) and data and instruction caches. Management of these resources is controlled by implementation-dependent tables.

Tables for managing TLBs and caches are referred to as replacement management tables RMT, which may be associated with each MMU. Although these tables are optional, it is often useful to provide a table for each critical resource, which can be a bottleneck in the system. An SPE group may also contain an optional cache hierarchy, the SL1 caches, which represent first level caches for DMA transfers. The SL1 caches may also contain an optional RMT.

The foregoing is intended to provide an introduction and description of the terminology used in cell processor implementations. The foregoing discussion is also intended to set forth a context for data structures and methods according to embodiments of the present invention. Such embodiments are not limited to implementation on or with cell processors having the architecture described above. However, any or all of the embodiments described below may be implemented using such cell architecture as an environment in which extended SPUlets may be encountered and utilized.

Figure 2:
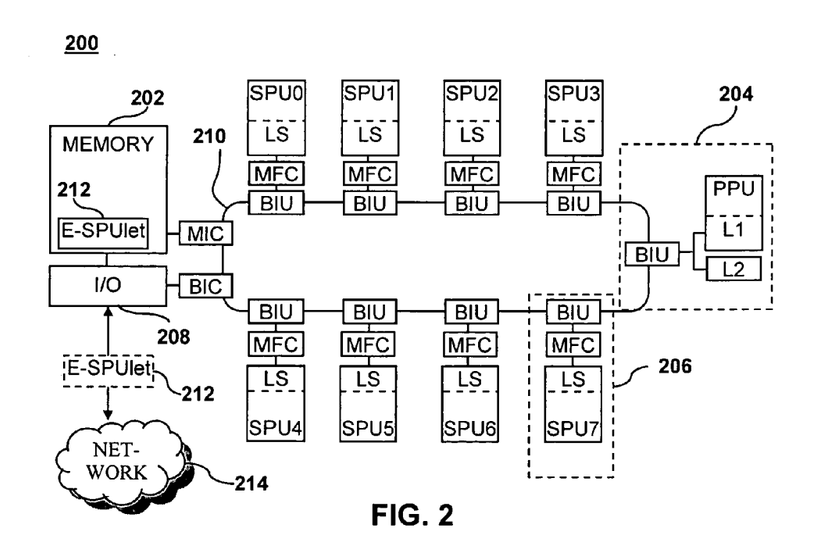
FIG. 2 is a schematic diagram of a cell processor an embodiment of the present invention.

FIG. 2 depicts an example of a cell processor 200 operating with extended SPUlets. For the purposes of illustration, the cell processor includes a main memory 202, a single PPE 204 and eight SPEs 206. However, a cell processor may be configured with any number of SPE's. With respect to FIG. 2, the memory, PPE, and SPEs can communicate with each other and with an I/O device 208 over a ring-type element interconnect bus 210. Extended SPUlets 212 may be stored in main memory 202, transferred to other cell processors, e.g., via the I/O device 208 and a network 214, or loaded piecewise into the various SPEs 206 that make up the cell processor.

Figure 3:
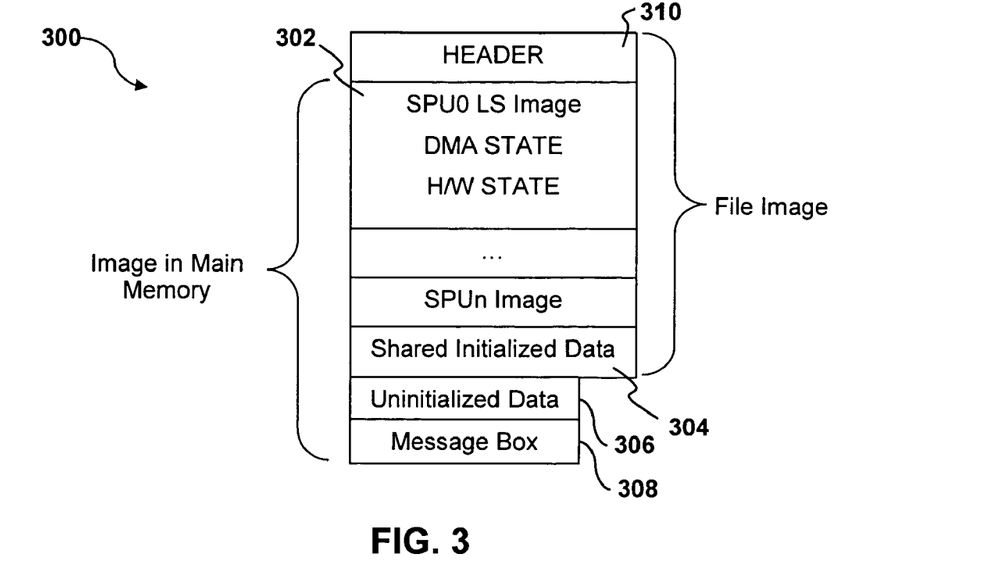
FIG. 3 is a block diagram illustrating an extended SPUlet according to an embodiment of the present invention.

As set forth above, the extended SPUlets 102, 212 generally include one or more SPU images and additional data, such as uninitialized data or they may include two or more SPU images. FIG. 3 illustrates the arrangement of data that can make up an extended SPUlet 300. This data may include but is not limited to SPU images 302, share initialized data 304, information relating to uninitialized data 306 and a message box 308. The extended SPUlet 300 may optionally include a file header 310.

The SPU images 302 typically contain the contents of the local store of an SPE in a cell processor. SPU images may be gathered from the SPEs during processing with the cell processor. The SPU images may contain data that has been processed by the SPU, data to be processed by the SPU, and code for processing the data with the SPU. The SPU images 302 may also contain data regarding a DMA state of the MFC and a hardware state of the SPE when the extended SPUlet 300 was suspended. The initialized data 304 is data, having established values that can be stored in main memory and/or shared amongst several SPE that are executing a particular process, depending on the configuration. In contrast, uninitialized data has no pre-established value, but parameters regarding that data are known. For example, the information relating to uninitialized data 306 may refer to the type of data, size and location of memory space needed for that data. The message box 308 is a window of memory where incoming and outgoing streams of data can be accessed by the SPUs and PPU. The host operating system can provide system service (communication socket, etc.) through the message box 308. The extended SPUlet 300 may also return information to the client environment using the message box 308 as an interface.

The message box area 308 is used for communication between PPU and extended SPUlet 300. The message box area may be divided into multiple message boxes. Each box can be used for a single direction of communication, e.g., extended SPUlet to PPE or PPE to SPE. The message box 308 could be configured as a single buffer or a ring buffer with a management area that is updated by a reader and writer for hand shaking. The format of information within the message box area 308 is up to the application, but there could be certain preset protocols. Such preset protocols may be indicated in the file header 310.

By way of example and without limitation, the file header 310 could indicate that the message box 308 is used for the extended SPUlet to communicate back to a client using certain protocols handled by the host. Alternatively, the file header 310 may indicate that the message box 308 is used for an SPE to request system service to the PPU. Examples of such system service include requesting additional memory, opening a new network connection, and the like. Furthermore, the file header 310 may indicate that the message box 308 is used for the PPU to request suspension of the extended SPUlet 300.

It is important to note that the particular contents of an extended SPUlet depend on context. For example, when an extended SPUlet has been saved to main memory, the image of the extended SPUlet 300 in system memory includes the SPU images 302, shared initialized data 304, information regarding uninitialized data 306 and message box 308. This combination of data elements is referred to as the image of the extended SPUlet in system memory. However, when the extended SPUlet 300 is transferred from a client device across a network to another cell processor (referred to herein as a host processor) a file header 310 is combined with the SPU images 302 and initialized data 304. This combination of data elements (referred to herein as a file image) is what is transferred.

The file header 310 header may include information that tells the host cell processor about the extended SPUlet. The header information may be categorized as either Execution Information or Extended SPUlet Information. Execution Information may include Host resources, connection requirements, and other criteria describing the environment in which the SPUlet should run. Extended SPUlet information describes things like memory layout, mapping, start offsets and other initialization, message box configuration.

Such information may include, e.g., memory availability (i.e., how much memory is needed to run the extended SPUlet), SPU availability (i.e., how many SPU are needed to run the extended SPUlet), network latency and bandwidth and system frequency requirements for the extended SPUlet, control flow information (e.g., whether the host or client machine has the right to interrupt and suspend the extended SPUlet), memory offsets, breakpoints of one or more SPU images, size of one or more SPU images, memory mapping information, message box layout, message box capabilities and the like. It should be understood that the header may also define information in connection with a user, id, system, function, data type, channel, flag, key, password, protocol, target or profile or any metric in which system or operation may be established wherein such may relate to or be directed from the extended SPUlet and including but not limited to configuration, initialization, modification or synchronization of operations involving any program or system or module or object that satisfies an overall goal of the application in which the extended SPUlet operates to serve. Such applications may include security related applications and protocols, encoding, decoding and transcoding applications, transactions, etc. The file header 310 can be created by the PPE just prior to transmission and transmitted with the SPU images and initialized data. Alternatively, the file header 310 may be part of the file image and sent as part of a stack transmission.

In general, an SPU cannot access privileged SPU control. Consequently it is often necessary for the extended SPUlet 300 to load each SPE with suitable code, which can be started when loaded. Furthermore, in order to communicate, the extended SPUlet 300 desirably includes memory mapping information that maps the SPEs involved to each other and to any shared portion of main memory.

Figure 4:
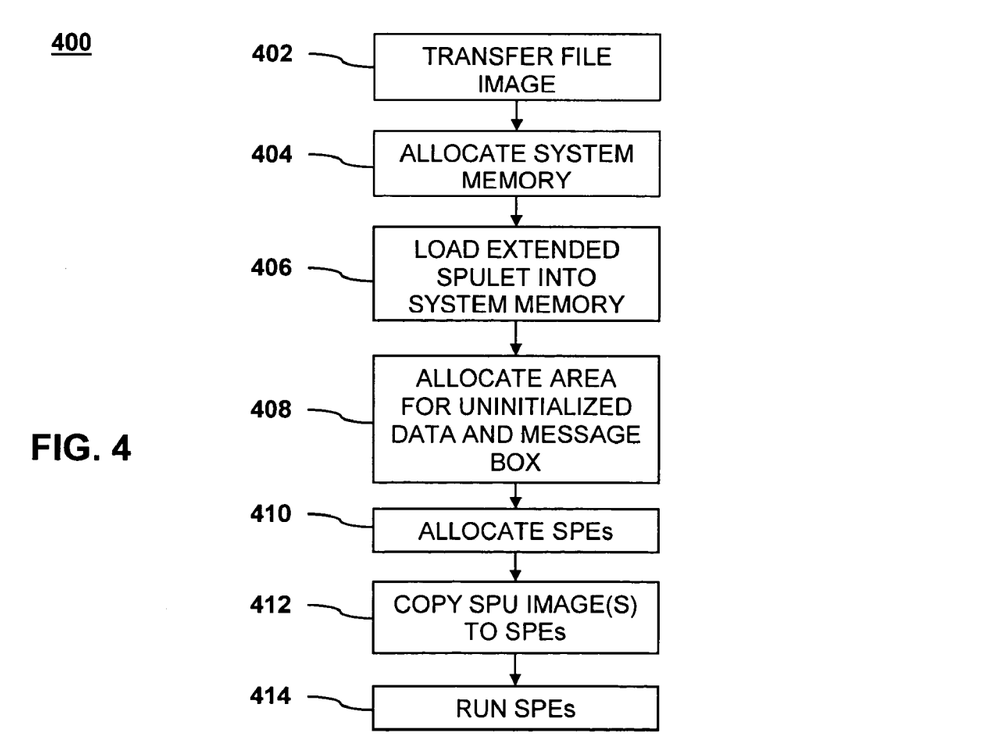
FIG. 4 is a flow diagram illustrating execution of an extended SPUlet according to an embodiment of the present invention.

FIG. 4 illustrates a general method 400 for operating two or more cell processors over a network using extended SPUlets. The extended SPUlet is transferred as a file image from the client device to the host device at step 402. Transfer of the file image between the host and client cell processors may take place across any network or bus, including but not limited to secure and unsecure networks, local area networks (LAN), wide area networks (WAN), or a public network such as the Internet. In some embodiments, the client machine may send the file header 310 to the host machine before sending the rest of the extended SPUlet. The host machine can analyze the information in the file header for acceptance criteria, e.g., whether the host machine or another device in which the SPUlet is directed, is known or determined to have sufficient SPUs, security clearance, rights, configuration, memory, etc. available to run the extended SPUlet. The host machine can then decide whether or not to accept the extended SPUlet or pass the extended SPUlet to another device or the target machine in which the SPUlet is directed.

Figure 5A:
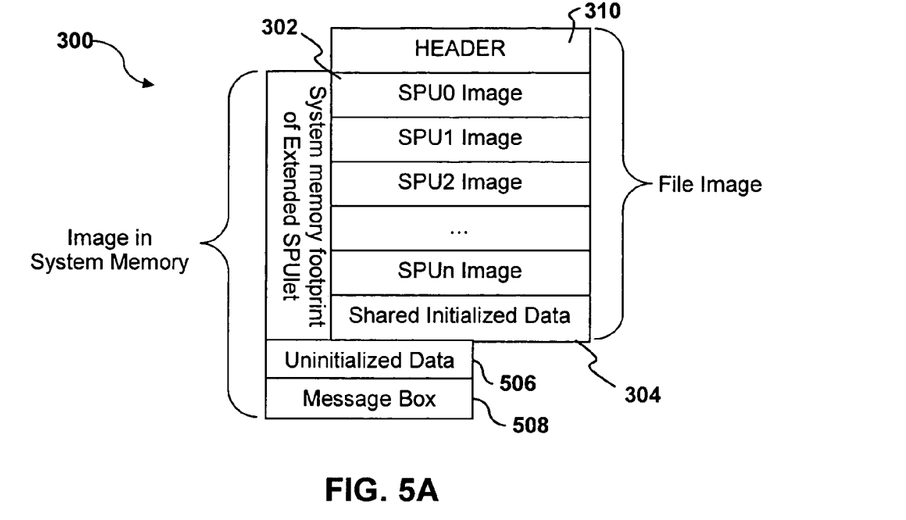
FIG. 5A is a block diagram illustrating memory allocation of an extended SPUlet during a stage of execution.
Figure 5B:
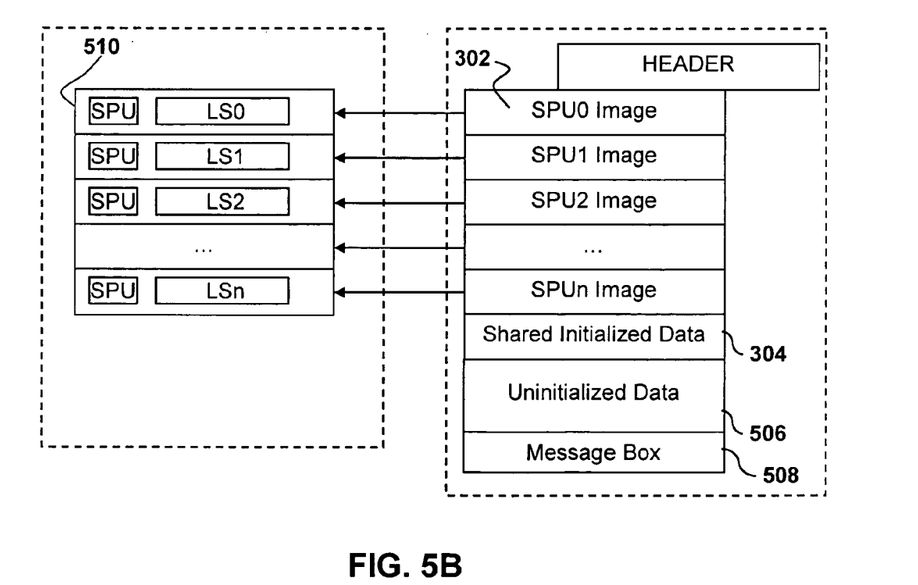
FIG. 5B is a block diagram illustrating memory allocation of an extended SPUlet during a different stage of execution.

If the host machine accepts the extended SPUlet, it allocates system memory for the extended SPUlet at step 404. The host machine may use the information in the file header to allocate the size and data type for a block of memory for the SPU images 302 and shared initialized data 304. Once the memory space has been allocated, the host processor can load the SPU images 302 and initialized data 304 of the extended SPUlet 300 into the main memory of the host cell processor at step 406. The host cell processor can then allocate an area for uninitialized data (if any) and a message box. It is preferred that memory is allocated in main memory of the PPU. However, specialized SPUlet application may configure memory in the PPU and/or in one or more SPU local stores, depending on specialized SPUlet applications. Generally, memory is allocated in main memory to satisfy the extended reach memory requirements for complex processing, such as video transcoding. FIGS. 5A-5B illustrate the organization of data for the extended SPUlet on the cell processor of the host device (the host cell processor). As shown in 5A, the host processor received the file image containing the SPU images 302, initialized data 304 and file header 310. Typically, only the SPU images 302 and initialized data 304 are stored in the host cell processor's main memory. These form the main memory footprint of the extended SPUlet 300. The data in the header 310 may be discarded once the host processor is finished with it.

At step 408, the host cell processor allocates an area in its main memory for uninitialized data 506 and a message box 508. As shown in FIG. 5A the combination of SPU images 302, Initialized data 304 and the areas allocated for uninitialized data 506 and the message box 508 constitute the image in the host cell processors main memory for the extended SPUlet 300. At step 410, the host processor allocates SPEs 510 (as shown in FIG. 5B) for the extended SPUlet 300. Once the SPEs 510 are allocated, the SPU images 302 are loaded into the allocated SPEs 510 at step 412. The SPEs can then be run on the host cell processors at step 414.

Figure 6:
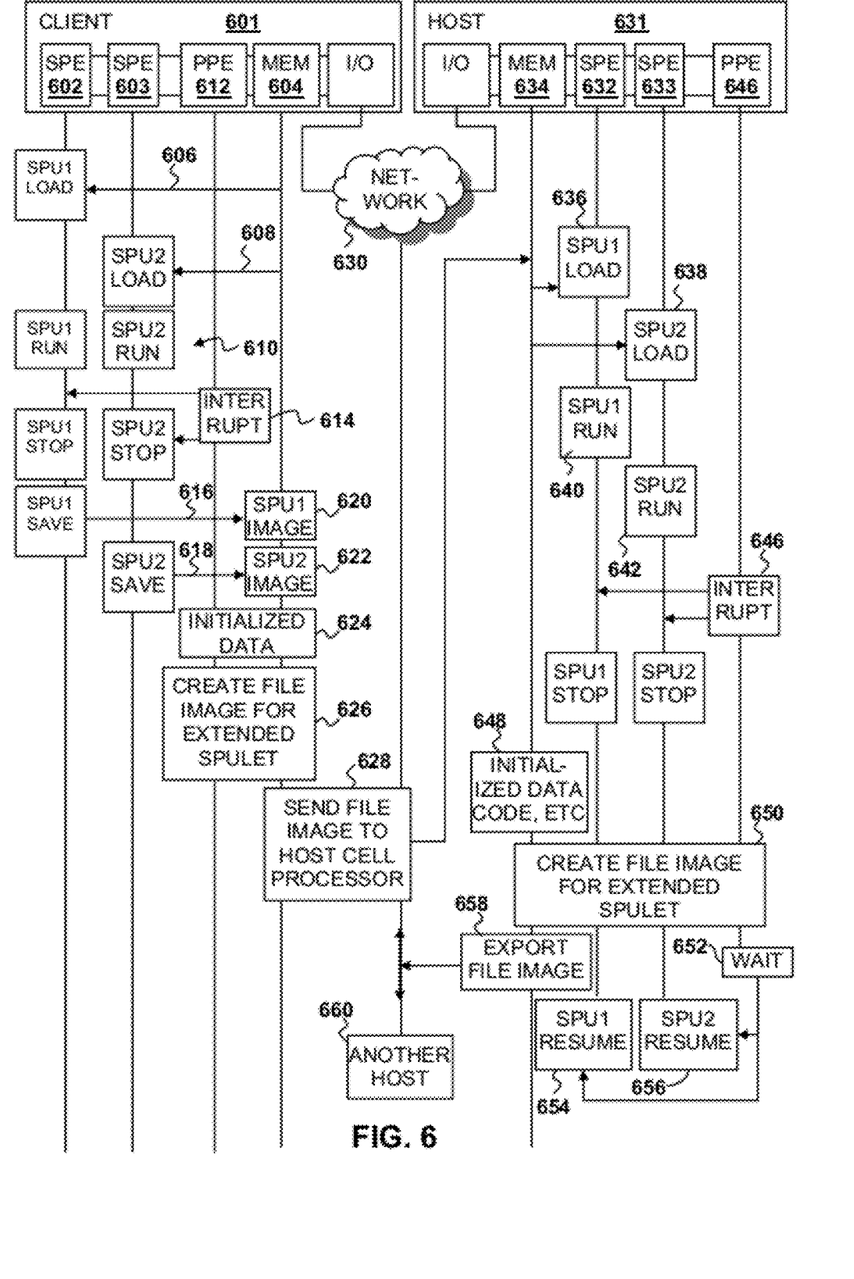
FIG. 6 is a flow diagram illustrating network operation of cell processors using extended SPUlets according to an embodiment of the present invention.

FIG. 6 illustrates additional examples of how extended SPUlets can migrate among cell processors across a network. An extended SPUlet may be created by any client. FIG. 6 shows an example of an SPUlet created by a client cell processor 601. In this example, the client cell processor is running a process that uses two of its SPEs 602, 603. The instructions and data from are loaded from main memory 604 into SPU1 and SPU2 as indicated at 606, 608. SPU1 and SPU2 run at 610. The host cell processor's PPE 612 determines that it is necessary to interrupt at 614 and signals SPU1 and SPU2 to stop. Such an interrupt may occur for any number of reasons. For example, the PPE may determine that there is higher priority work that requires the SPEs 602, 603. Alternatively, the process may have proceeded to a point where it can be more efficiently completed elsewhere. In particular, the process may have proceeded to a point where it is about to generate a large amount of data that is to be transferred to a host device. It may be more efficient in terms of network bandwidth to transfer the partially completed process to the host device and let that device generate the data.

After the SPU1 and SPU2 are stopped local store contents of SPU1 and SPU2 are saved at 616, 618 to main memory 604 as SPU images 620, 622. At 624 the PPE 612 creates a file image an extended SPUlet containing the SPU images 620, 622 and initialized data 626. The initialized data may have been created in system memory by SPEs 602, 603 the PPE 612. The file image may be created by bundling the SPU images 620, 622 with the initialized data 626 and a file header as described above. At 628 the file image is sent over a network 630 to a host cell processor 631. Assuming acceptance criteria in the file header have been met, the SPU images 620, 622 and initialized data 626 are loaded into the host cell processor's main memory 634. From there, the SPU images 620, 622 can be loaded into the SPEs 632, 633 of the host cell processor 631 as indicated at 636, 638 and run as indicated at 640, 642. The SPEs 632, 633 may continue to run until they are finished as in any normal cell processing application. Upon completion the extended SPUlet returns status to the client processor 601 and (optionally) notifies the host processor 631 of the completion. The operating system (OS) running on the host processor 631 can then destroy (i.e., overwrite) the extended SPUlet image and associated data in main memory 634.

Alternatively, at 644, the host cell processor's PPE 646 may interrupt the SPU operations on the SPEs 632, 633, e.g., to make them available for higher priority work. Once SPU operation has stopped, the SPU images can be saved to main memory as discussed above. The SPU images may be bundled with initialized data 648, code, etc. into a file image at 650. Alternatively, the PPE 646 can wait at 652 until SPEs become available. The SPUs can then resume SPU operation at 654, 656. Alternatively, the file image can be exported at 658 over the network 630 to another host 660 or back to the client processor 601.

In the preceding example SPU images 620, 622 were saved by the host cell processor 601 at 616, 618. Similarly, the process of creating the file image at 650 could involve saving SPU images on the host cell processor 631. To allow migration of the extended SPUlet a capability for suspending and resuming is desirable. Preferably, suspension involves a cooperative yield of execution. In particular, the host OS notifies the extended SPUlet to suspend. The SPUlet then stops all DMA and SPE execution, gracefully yields execution and notifies the host OS. The host OS can save the execution state of the extended SPUlet.

Figure 7:
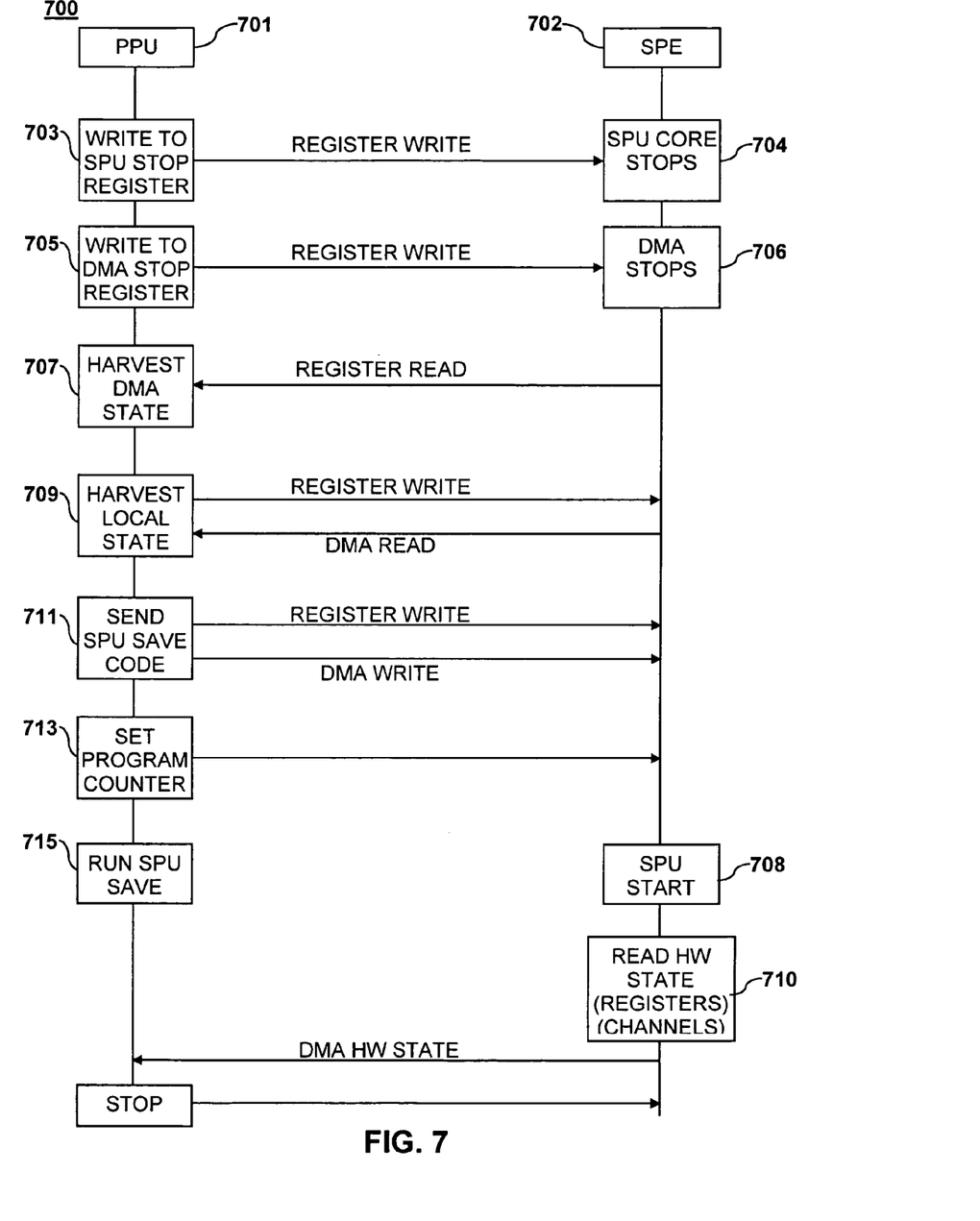
FIG. 7 is a flow diagram illustrating an example of saving the state of an SPU.

The flow diagram of FIG. 7 illustrates an example of a process 700 for a client or host cell processor to save an execution state for an extended SPUlet. For the purposes of illustration, this diagram shows the actions of a cell processor's PPE 701 and one of its SPE 702. Those of skill in the art will recognize that the same process can be expanded to save multiple SPU images.

The PPU 701 stop execution of whatever process is running on the SPE 702. For example, the PPU can write to a stop register of the SPE's SPU at 703. The SPU core of the SPE 702 consequently stops at 704. In addition, it may be necessary to stop DMA activity on the MFC of the SPE 702. Specifically, the PPU 701 can write to a DMA STOP register of the MFC of the SPE 702 at 705 to stop the DMA at 706. Once DMA has stopped, at 707 the PPU 701 can harvest the DMA state of the SPE 702. This can be done by reading DMA registers containing information regarding the state of DMA operation at the time SPU execution stopped at 706. This information can be stored in main memory as part of an extended SPUlet for the SPE 702.

At 709 the PPU harvests the local state of the SPE 702, i.e., the contents of the local storage (LS) of the SPE 702. This operation may involve writing to an SPU register and DMA reading the LS contents via the MFC. The LS typically contains both code and data, which are saved to main memory as part of the extended SPUlet, e.g., the SPU image.

It is often desirable to save the hardware state of the SPU, i.e., the values of the registers and channels as part of the extended SPUlet. To save this information as part of the SPU image, the PPE may have to send an SPU SAVE code to the SPE 702 at 711. This operation may involve a register write and a DMA write to transfer the code. The PPU may then set the SPU's program counter at 713 and signal the SPU to run the SPU SAVE code at 715, e.g., by writing to the SPU's run register. The SPU starts the SPU SAVE code at 708 reads the registers and channels that make up the hardware state at 710 and sends the hardware state information to main memory at 712 as part of the extended SPUlet.

Figure 8:
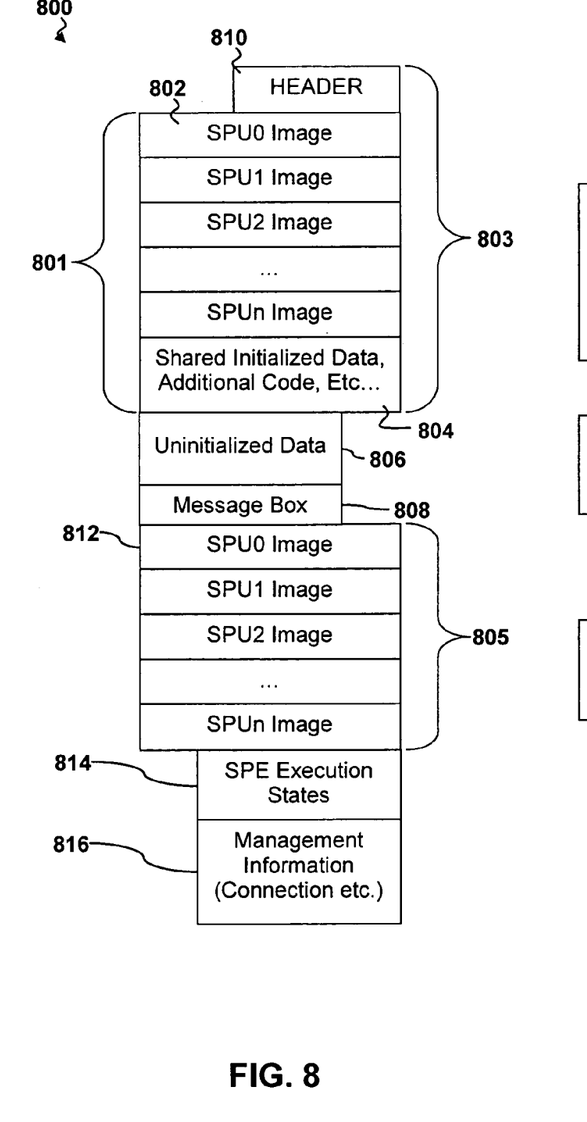
FIG. 8 is a block diagram illustrating the memory structure of suspended state information to be saved for a SPUlet that has been suspended according to an embodiment of the present invention.

Saving the SPU image and other information is part of the process of suspending SPU operation. FIG. 8 illustrates an example of suspended information 800 that can be saved as an extended SPUlet. In this example, a task executing on a single Cell system has been suspended and made into an extended SPUlet that can migrate to another host. The information 800 includes SPU images 802, shared information 804 such as initialized data, additional code, information regarding uninitialized data 806 and a message box 808 as discussed above. The preceding information constitutes the system memory image 801. The SPU images 802 and shared information 804 may be combined with a file header 810 to form a file image 803. In addition the information 800 includes SPU images 812 corresponding to runtime LS states 805.

The SPU images 802 in the file image 803 are what gets loaded when the SPUlet starts executing. The SPU images 802 do not have to be full Local Storage size. They can load additional code from system memory on their own. The suspended SPU images 812 are snapshots of the Local Storage state, which has to be full Local Storage size and reflects the loading and unloading of code and data that had been done up to the point it was suspended.

The information 800 further includes SPE processor execution states 814 (e.g., the hardware states and DMA states discussed above). By way of example, and without limitation, the processor execution states 814 may include registers, channel state, MFC state, instruction pointer, decrementer, and floating point exception state. The execution states 814 are separated because an extended SPUlet initially does not require such information when it gets started. An extended SPUlet can assume a fresh start with no context information required. A suspended SPUlet, by contrast, needs to save all the hardware context information in order to resume execution.

In addition, the information 800 may include management information 816, such as connection information. At minimum, the host needs to store the information about the client such as IP addresses. The information necessary to resume execution and reestablish the connection with the client needs to be passed to the host where the extended SPUlet migrates to. What gets included here is dependent on the authentication model of the migration.

Although the idea does not exclude such a scenario, in order for the SPUlet to be capable of migration, it should likely need to be configured at compile time to be a migratable SPUlet. Since migration is moving a program from one runtime environment to another, the program needs to be well isolated from anything else on the system. In embodiments of the invention a Cell-based distributed network may have all of its executable programs in the form of extended SPUlets to start with. In such a case if an extended SPUlet starts executing locally, migration to another host only requires saving the context. It is not necessary to dynamically create an extended SPUlet from arbitrary working sets of SPE programs.

Figure 9:
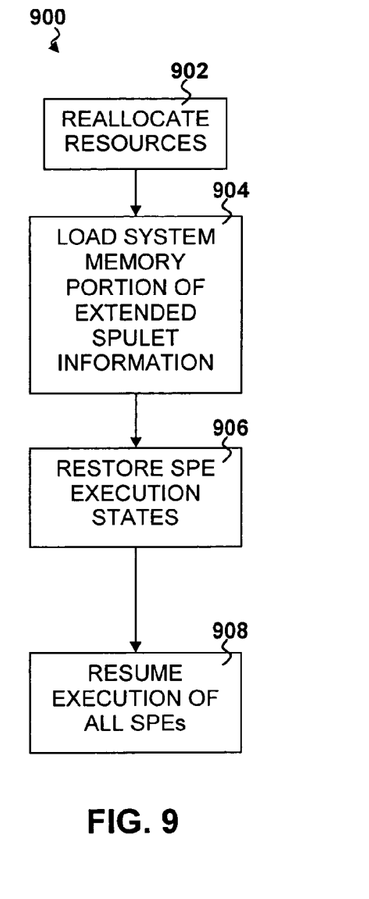
FIG. 9 is flow diagram illustrating an example of resuming operation of an extended SPUlet that has been suspended.

The preceding discussion of FIG. 6 mentions resumption of suspended SPUlets at 654, 656. By way of example, and without loss of generality, the flow diagram of FIG. 9 illustrates a process 900 for resumption of suspended execution of an extended SPUlet. At 902 system resources, such as SPEs, and main memory, message box, etc. are reallocated to run the extended SPUlet. At 904 a main memory portion of the saved information, e.g., the SPU local store runtime images are loaded into SPEs. At 906 the SPE execution states are restored and execution of the SPEs resumes at 908.

Figure 10:
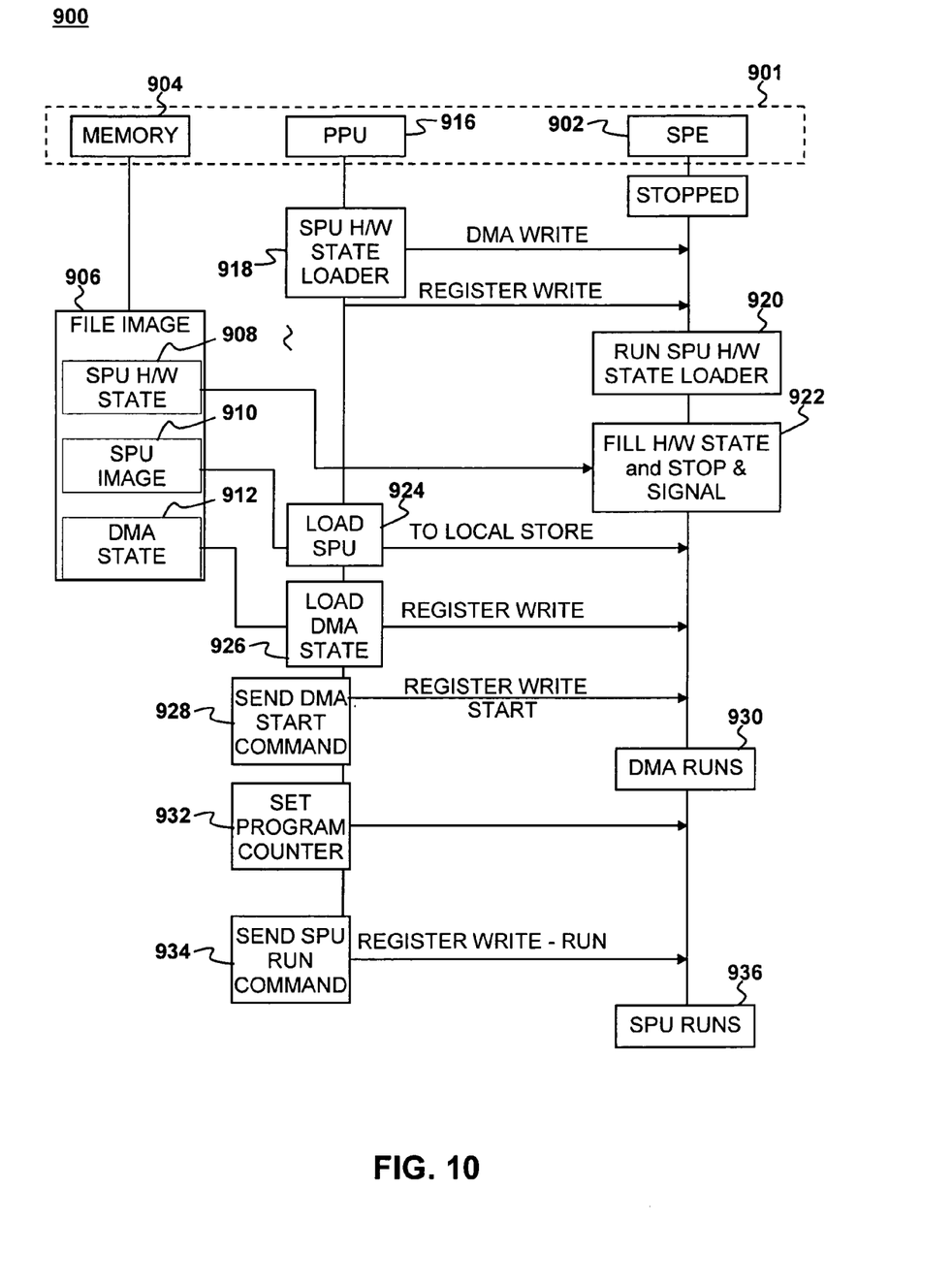
FIG. 10 is a flow diagram illustrating illustrates a process resumption of suspended execution of an SPE.

By way of example, and without loss of generality, the flow diagram of FIG. 10 illustrates in further detail a process resumption of suspended execution of an SPE 1002 of a cell processor 1001. Those of skill in the art will recognize that the process depicted in FIG. 10 may be expanded to include resumption of suspended execution of multiple SPEs. In this example, a main memory 1004 of a cell processor 1001 is loaded with an extended SPUlet 1006, e.g., a file image, containing an SPU hardware state 1008, an SPU local store image 1010 and a DMA state 1012. The extended SPUlet 1006 may have been stored as a result of interruption and suspension of a process running on the cell processor 1001 or it may have been imported from another cell processor. In either case it is assumed for the purposes of this example that the SPE 1002 is stopped at 1014.

The PPU 1016 of the cell processor 1001 sends a hardware state loader program 1018 to the SPE 1002. This operation may involve a DMA write to the LS of the SPE 1002 and a register write to the SPU of the SPE 1002 to run the hardware state loader program at 1020. At 1022, under control of the hardware state loader program 1020, the SPE 1002 loads the SPU hardware state 1008 from the extended SPUlet 1006 stored in main memory 1004 and executes a STOP and SIGNAL instruction. Under this instruction, execution of the program in the SPU stops, and the external environment (e.g., the PPU 1016) is signaled. No further instructions are executed. At 1024 The PPU 1016 then loads the SPU image 1010 from main memory 1004 to the local store of the SPE 1002. At 1026, the PPU 1016 loads the DMA state 1012 from main memory 1004 to SPE local store, e.g., by writing to appropriate registers.

The PPU 1016 sends a DMA start command to the SPEs MFC at 1028 to start DMA operation. This may involve writing to an MFC start register. DMA runs commence at 1030. The program counter is set at 1032. The PPU 1016 sends an SPU run command at 1034, e.g., by writing to an SPU run register. The SPU then runs at 1036, e.g., starting from the point where operation had been suspended.

Note that the process for initially loading an extended SPUlet the hardware state filling and DMA state loading steps is essentially as described above with respect to FIG. 10 except that the hardware state and DMA state loading sequences may be eliminated. For an initial load, there is generally to DMA or hardware state to restore.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for operating a client processor and a host processor over a network, wherein the client processor has a client main memory, a client main processor and two or more client secondary processors and the host processor has a host main processor, a host main memory and two or more host secondary processors, wherein each client secondary processor and each host secondary processor has an exclusively associated memory and a memory flow controller (MFC), the method comprising:
   running a process on a client processor wherein the process runs on two or more client secondary processors, wherein the process uses a message box in the form of a window of memory where incoming and outgoing streams of data can be accessed by the client main processor and client secondary processors;
   suspending the process that runs on the two or more client secondary processors;
   saving an execution state of the process that runs on the two or more client secondary processors by either
   a) saving an execution state of two or more client secondary processors running the process on the client processor into a single file in the main memory, wherein the execution state includes contents of the exclusively associated memories for the two or more client secondary processors, information regarding the message box that a host processor can use to set up the message box and communicate with the client processor through the message box, and data regarding a state of the MFC and a hardware state of the two or more client secondary processors that were running the process, wherein the contents of the exclusively associated memories for the two or more client secondary processors includes executable code for running the process, or
   b) saving an execution state of one or more of the client secondary processors that were running the process that runs on the two or more client secondary processors and shared initialized data for the process that runs on the two or more client secondary processors into a single file in the main memory, wherein the execution state includes contents of the exclusively associated memory for at least one of the client secondary processors and shared initialized data of the suspended process, information regarding the message box that a host processor can use to set up the message box and communicate with the client processor through the message box, and data regarding a state of the MFC and a hardware state of the at least one of the client secondary processors that were running the suspended process, wherein the contents of the exclusively associated memory of the at least one of the client secondary processors includes executable code for running the process; and
   transferring the single file from the client processor over a network to the host processor;
   wherein the single file containing the saved execution state of the process is configured to permit the host processor to resume processing of the suspended process.

2. The method of claim 1, further comprising allocating space in a main memory of a host processor (host main memory) for the contents of the exclusively associated memory of the one secondary processor and initialized data.

3. The method of claim 2, further comprising loading the contents of the exclusively associated memory of the one secondary processor and initialized data into the allocated space in the host main memory.

4. The method of claim 1 further comprising, allocating an area in a main memory of a host processor (host main memory) for uninitialized data and the message box.

5. The method of claim 1, further comprising loading the file onto the host processor.

6. The method of claim 5 wherein loading the file includes loading the contents of the exclusively associated memory of the one secondary processor into an exclusively associated memory of a secondary processor on the host processor.

7. The method of claim 5, further comprising running a process from the file on the secondary processor of the host processor.

8. The method of claim 5, further comprising suspending running of the process on the secondary processor of the host processor.

9. The method of claim 8 wherein suspending the running of the process includes stopping all DMA and secondary processor execution of the process.

10. The method of claim 8 wherein suspending the running of the process includes saving an execution state of one or more secondary processors running the process.

11. The method of claim 10 wherein the execution state includes a runtime local store state containing the contents of exclusively associated memories of one or more secondary processors and a secondary processor state containing secondary processor execution state information.

12. The method of claim 10, further comprising passing the execution state to different host.

13. The method of claim 12 wherein passing the execution state to the different host includes passing the execution state over the network to the different host.

14. The method of claim 10, further comprising sending the execution state from the host back to the client.

15. The method of claim 10, further comprising resuming running of the process on one or more secondary processors of the host processor.

16. The method of claim 15 wherein resuming running of the process includes a system memory portion of the file.

17. The method of claim 15 wherein resuming running of the process includes restoring a secondary processor execution state.

18. The method of claim 15 wherein resuming the process includes:
   filling one or more registers of the secondary processor of the host processor with hardware state data from the saved execution state.

19. The method of claim 18 wherein filling the one or more registers includes:
   loading a hardware state loader program into the secondary processor of the host processor.

20. The method of claim 19 wherein filling the one or more registers includes running the hardware state loader program on the secondary processor of the host processor.

21. The method of claim 15 wherein resuming running of the process includes loading contents of the exclusively associated memory for a secondary processor from the file into the exclusively associated memory for a secondary processor of the host processor.

22. The method of claim 15 wherein resuming running of the process includes filling one or more registers of the secondary processor of the host processor with direct memory access (DMA) state data from the file.

23. The method of claim 15 wherein resuming running of the process includes reallocating resources to the process.

24. The method of claim 1 wherein saving the state includes:
   stopping a core of the secondary processor running the process.

25. The method of claim 24 wherein saving the state includes, after stopping the core, stopping the MFC of the secondary processor running the process.

26. The method of claim 24 wherein saving the state further includes:
   harvesting a state of the MFC from one or more registers.

27. The method of claim 24 wherein saving the state further includes harvesting a local state from the MFC.

28. The method of claim 1 wherein saving the state further includes sending a save code to the secondary processor and running the code on the secondary processor.

29. The method of claim 28 wherein running the code on the secondary processor includes reading a hardware state the secondary processor.

30. The method of claim 29 wherein reading the hardware state includes reading one or more registers of the secondary processor.

31. The method of claim 29 wherein reading the hardware state includes reading one or more channels of the SPU.

32. The method of claim 1, further comprising resuming the process on a secondary processor of the host processor.

33. The method of claim 32 wherein resuming the process includes:
   filling one or more registers of the secondary processor of the host processor with hardware state data from the file.

34. The method of claim 33 wherein filling the one or more registers includes:
   loading a hardware state loader program into the secondary processor of the host processor.

35. The method of claim 34 wherein filling the one or more registers includes running the hardware state loader program on the secondary processor of the host processor.

36. The method of claim 32 wherein resuming running of the process includes loading contents of an exclusively associated memory for a secondary processor from the file into the local store of the secondary processor of the host processor.

37. The method of claim 32 wherein resuming running of the process includes filling one or more registers of the secondary processor of the host processor with direct memory access (DMA) state data from the file.

38. The method of claim 1, further comprising transferring a file header from the client processor to the host processor.

39. The method of claim 38, further comprising determining with the host processor whether to accept the file based on information in the file header.

40. The method of claim 38 wherein the file header includes a message box layout or message box capabilities.

41. The method of claim 38 wherein the file header defines information in connection with a user, id, system, function, data type, channel, flag, key, password, protocol, target or profile or any metric in which system or operation may be established wherein such may relate to or be directed from the file.

42. The method of claim 38 wherein the file header defines information related to configuration, initialization, modification or synchronization of operations involving any program or system or module or object that satisfies an overall goal of the application in which the file operates.

43. The method of claim 38 wherein transferring the file header includes creating the file header prior to transferring the file.

44. The method of claim 38 wherein transferring the file header includes transferring the file header as part of the file.

45. The method of claim 1, wherein saving the execution state of the process includes:
   a) saving an execution state of two or more secondary processors running the process on the client processor into a single file in the main memory, wherein the execution state includes contents of the exclusively associated memories for the two or more secondary processors, and data regarding a state of the MFC and a hardware state of the two or more of the secondary processors that were running the process, and executable code for running the process.

46. A non-transitory processor readable medium having embodied therein executable code and data representing a saved execution state of a processor system having a main processing unit, two or more secondary processors, and a main memory coupled to the main and secondary processors, wherein each secondary processor has an exclusively associated memory, the saved execution state comprising:
   a single file containing either
   a) contents of the exclusively associated memory for one of the two or more secondary processors and shared initialized data related to a suspended process execution state and information regarding a message box in the form of a window of memory where incoming and outgoing streams of data can be accessed by the client main processor and client secondary processors, wherein the information is configured such that a host processor can use the information to set up the message box and communicate with the client processor through the message box, wherein the contents of the exclusively associated memory and shared initialized data include executable code configured to run the suspended process on the processor system or
   b) contents of exclusively associated memories of two or more secondary processors related to the execution state of a suspended process including executable code for processing data with the two or more secondary processors and data to be processed by executing the code with the two or more of the secondary processors, wherein the contents of the two or more of the exclusively associated memories include executable code configured to run the suspended process on the processor system and information regarding a message box in the form of a window of memory where incoming and outgoing streams of data can be accessed by the client main processor and client secondary processors, wherein the information is configured such that a host processor can use the information to set up the message box; wherein the single file containing the saved execution state of the process is configured to permit a different processor system to resume processing of the suspended process.

47. The processor readable medium of claim 46 wherein the file further comprises a file header.

48. The processor readable medium of claim 47 wherein the file header includes one or more of the following types of information: memory availability, secondary processor availability, network latency, network bandwidth, system frequency, control flow information, memory offsets, breakpoints of contents of one or more exclusively associated local memories for secondary processors, size of contents of one or more exclusively associated local memories for secondary processors, memory layout, memory mapping information, message box layout, message box capabilities, host resources, connection requirements, and other criteria describing the environment in which the file should run.

49. The processor readable medium of claim 48 wherein the control flow information includes information regarding whether a host or client processor can interrupt the process.

50. The processor readable medium of claim 47 wherein the file header defines information in connection with a user, id, system, function, data type, channel, flag, key, password, protocol, target or profile or any metric in which system or operation may be established wherein such may relate to or be directed from the file.

51. The processor readable medium of claim 47 wherein the file header defines information related to configuration, initialization, modification or synchronization of operations involving any program or system or module or object that satisfies an overall goal of the application in which the file operates.

52. A processor system having a main processing unit, two or more secondary processors and a main memory coupled to the main and secondary processors, wherein each secondary processor has an exclusively associated memory, the processor having embodied in the main memory or exclusively associated memory data representing a saved process execution state of a suspended process, the saved process execution state comprising:
  a single file containing either
  a) contents of an exclusively associated memory of a secondary processor and shared initialized data related to a suspended process execution state of a different processor system, wherein the contents of the exclusively associated memory includes executable code for running the suspended process on the processor system and information regarding a message box in the form of a window of memory where incoming and outgoing streams of data can be accessed by the client main processor and client secondary processors, wherein the information is configured such that a host processor can use the information to set up the message box and communicate with the client processor through the message box, or
  b) contents of exclusively associated memories of two or more secondary processors related to the saved process execution state, wherein the contents of the two or more secondary processors includes executable code for running the suspended process on the processor system and information regarding a configuration of a message box in the form of a window of memory where incoming and outgoing streams of data can be accessed by the client main processor and client secondary processors, wherein the information is configured such that a host processor can use the information to set up the message box;
wherein the single file containing the saved execution state of the process is configured to permit a different processor system to resume processing of the suspended process.

53. The cell processor of claim 52 wherein the file further comprises a file header.

54. The cell processor of claim 53 wherein the file header includes one or more of the following types of information: memory availability, secondary processor availability, network latency, network bandwidth, system frequency, control flow information, memory offsets, breakpoints of contents of one or more exclusively associated local memories for secondary processors, size of contents of one or more exclusively associated local memories for secondary processors, memory layout, memory mapping information, message box layout, message box capabilities, host resources, connection requirements, and other criteria describing the environment in which the file should run.

55. The cell processor of claim 54 wherein the control flow information includes information regarding whether a host or client processor system can interrupt the process.

56. The cell processor of claim 53 wherein the file header defines information in connection with a user, id, system, function, data type, channel, flag, key, password, protocol, target or profile or any metric in which system or operation may be established wherein such may relate to or be directed from the file.

57. The cell processor of claim 53 wherein the file header defines information related to configuration, initialization, modification or synchronization of operations involving any program or system or module or object that satisfies an overall goal of the application in which the file operates.

58. The cell processor of claim 52 wherein the processor system is a cell processor.

59. The cell processor of claim 52 wherein the cell processor includes one or more SPE groups, wherein each SPE group includes two or more SPE.

60. The cell processor of claim 52 wherein the cell processor includes one or more power processor element (PPE) groups, wherein each PPE group includes two or more PPEs.

61. The cell processor of claim 52 wherein the cell processor includes eight SPE, wherein the eight SPE, PPU and main memory are coupled to each other via a ring bus.

\* \* \* \* \*